United States Patent
Rathinasamy et al.

(10) Patent No.: US 11,595,145 B1
(45) Date of Patent: Feb. 28, 2023

(54) HIGH-DENSITY SWITCH

(71) Applicant: Dell Products L.P., Round Rock, TX (US)

(72) Inventors: Shree Rathinasamy, Round Rock, TX (US); Maunish A. Shah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/465,647

(22) Filed: Sep. 2, 2021

(51) Int. Cl.
  *H04Q 11/00* (2006.01)
  *H04J 14/02* (2006.01)
  *G02B 6/35* (2006.01)

(52) U.S. Cl.
  CPC .......... *H04J 14/0212* (2013.01); *G02B 6/354* (2013.01); *H04Q 11/0003* (2013.01); *H04Q 2011/0007* (2013.01); *H04Q 2011/0037* (2013.01); *H04Q 2201/04* (2013.01); *H04Q 2201/10* (2013.01)

(58) Field of Classification Search
  USPC ..................................................... 398/45–57
  See application file for complete search history.

(56) References Cited

U.S. PATENT DOCUMENTS

| | | | | |
|---|---|---|---|---|
| 9,232,678 B2* | 1/2016 | Bailey | .................. | H05K 7/1492 |
| 2010/0054681 A1* | 3/2010 | Biribuze | .............. | G02B 6/4452 |
| | | | | 385/135 |
| 2015/0331216 A1* | 11/2015 | Smrha | .................. | G02B 6/3897 |
| | | | | 385/135 |
| 2016/0128230 A1* | 5/2016 | Lam | .................... | H05K 7/20727 |
| | | | | 361/679.01 |
| 2016/0191308 A1* | 6/2016 | Berry | .................. | H04L 41/0886 |
| | | | | 709/221 |
| 2016/0191314 A1* | 6/2016 | Russell | .................... | H04L 41/22 |
| | | | | 709/221 |
| 2021/0247580 A1* | 8/2021 | Reagan | ................ | G02B 6/4444 |
| 2021/0345024 A1* | 11/2021 | Leigh | .................. | H04J 14/0227 |
| 2022/0141990 A1* | 5/2022 | Gupta | .................. | H05K 7/2039 |
| | | | | 361/709 |

FOREIGN PATENT DOCUMENTS

JP     2011141394     *  7/2011   ............... G02B 6/00

* cited by examiner

*Primary Examiner* — Li Liu
(74) *Attorney, Agent, or Firm* — Jackson Walker L.L.P.

(57) ABSTRACT

An information handling system may include a processor and a plurality of ports communicatively coupled to the processor, and physically arranged in a first row and a second row at an exterior panel of an enclosure of the information handling system, such that the plurality of ports includes front ports of the first row visible when the exterior panel is viewed head on, rear ports of the first row located directly behind the front ports of the first row from a perspective in which the exterior panel is viewed head on, front ports of the second row visible when the exterior panel is viewed head on, and rear ports of the second row located directly behind the front ports of the second row from the perspective in which the exterior panel is viewed head on.

12 Claims, 4 Drawing Sheets

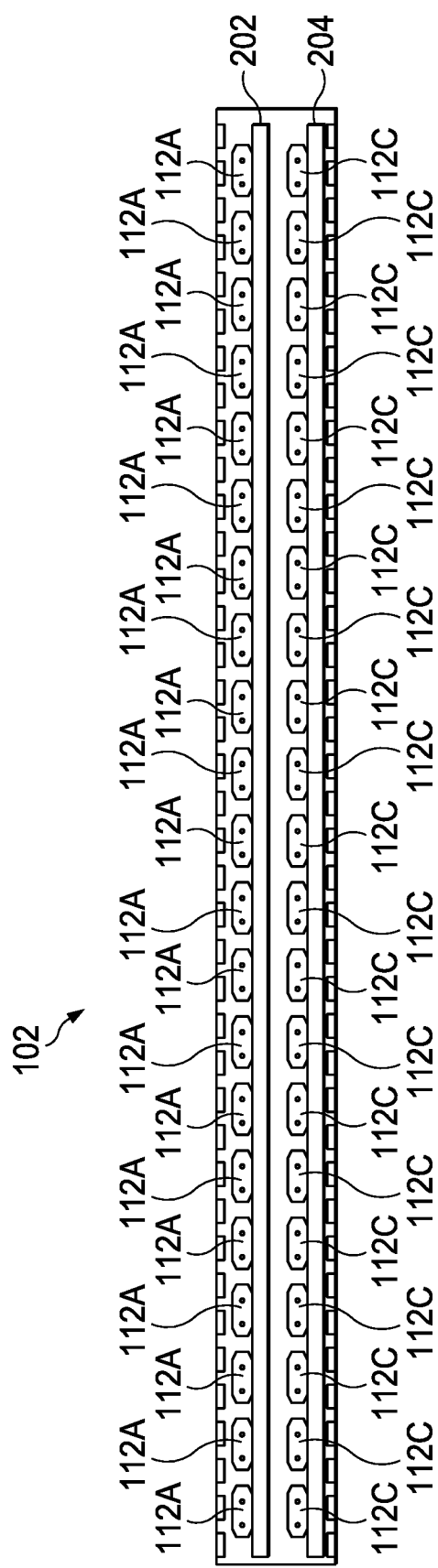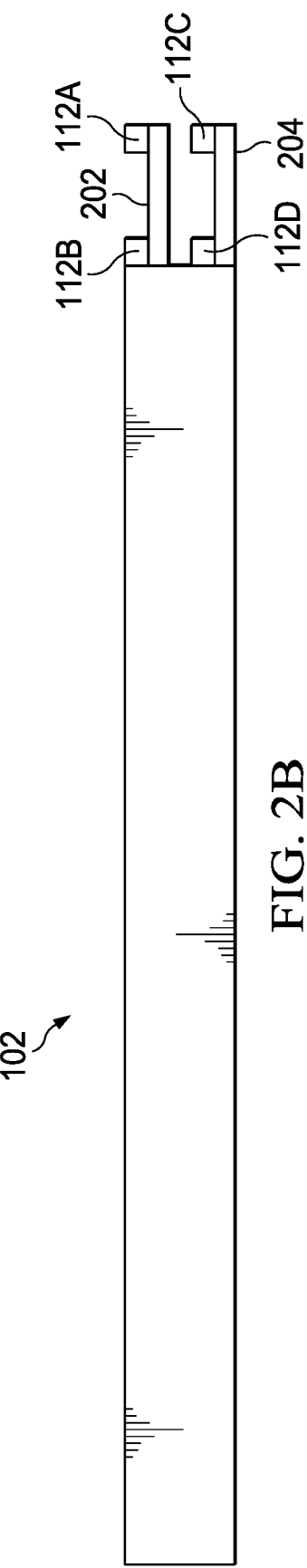
FIG. 2A
FIG. 2B

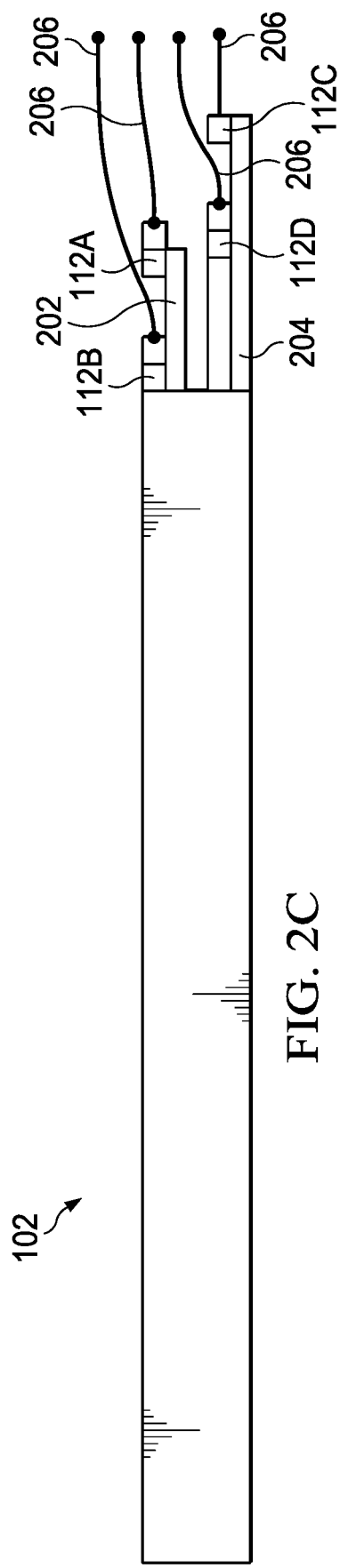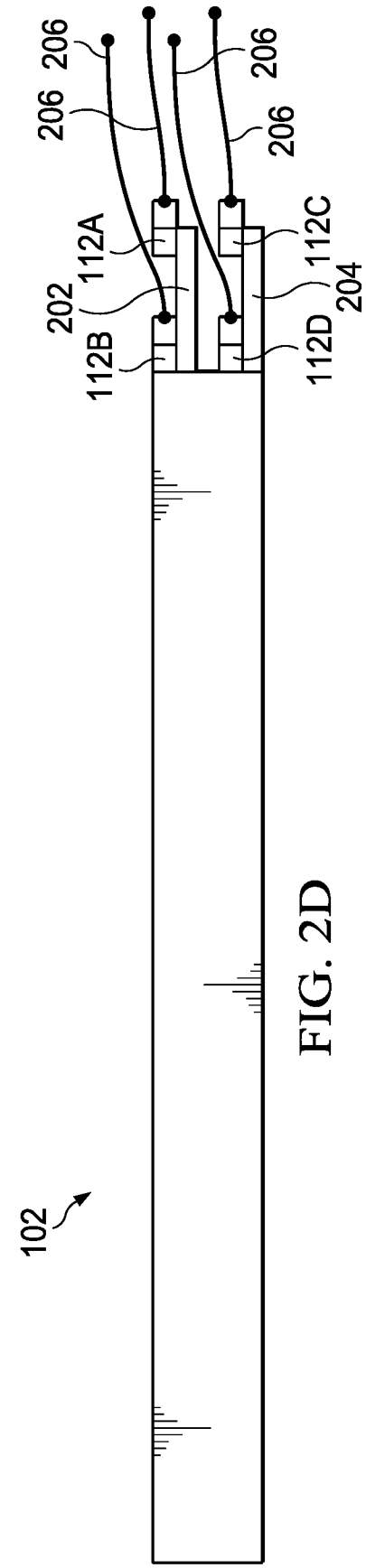

HIGH-DENSITY SWITCH

TECHNICAL FIELD

The present disclosure relates in general to information handling systems, and more particularly to systems and methods for providing a high-density optical fiber connectivity to a switch or other information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may have a network interface or other input/output (I/O) interface having an optical port, including an optical interface for communication of data via an optical cable. An example of such information handling system includes a switch having multiple optical ports, each optical port configured to receive a corresponding optical cable.

Industry forecasts suggest that processors (e.g., an application-specific integrated circuit) for future generation optical switches may support 51.2-terabit/second switch capacity, meaning a co-packaged optics processor may support 1024 optical fibers using a parallel opto-electronic interface. To fully support such increase in switch capacity, switch front panels at where optical ports are present may require presence of significantly more optical ports than are present in existing switches. For example, while traditional implementations may use switches sized at one rack unit (RU) and have sufficient front panel area to support the needed number of optical ports, advances in accordance with industry forecasts described above may require the use of a significantly increased number of optical ports.

While an obvious solution may be to simply increase physical dimensions of a switch to enlarge the front panel, such a solution has its own disadvantage of taking up additional space, which may be undesirable in a data center environment for which it is desired to maximize the number of computing devices present in the data center.

SUMMARY

In accordance with the teachings of the present disclosure, the disadvantages and problems associated with existing optical switches may be reduced or eliminated. In accordance with embodiments of the present disclosure, an information handling system may include a processor and a plurality of ports communicatively coupled to the processor, and physically arranged in a first row and a second row at an exterior panel of an enclosure of the information handling system, such that the plurality of ports includes front ports of the first row visible when the exterior panel is viewed head on, rear ports of the first row located directly behind the front ports of the first row from a perspective in which the exterior panel is viewed head on, front ports of the second row visible when the exterior panel is viewed head on, and rear ports of the second row located directly behind the front ports of the second row from the perspective in which the exterior panel is viewed head on.

In accordance with these and other embodiments of the present disclosure, a method may include coupling a plurality of ports to a processor, physically arranging the plurality of ports in a first row and a second row at an exterior panel of an enclosure of an information handling system comprising the plurality of ports and the processor, such that the plurality of ports includes: front ports of the first row visible when the exterior panel is viewed head on, rear ports of the first row located directly behind the front ports of the first row from a perspective in which the exterior panel is viewed head on, front ports of the second row visible when the exterior panel is viewed head on, and rear ports of the second row located directly behind the front ports of the second row from the perspective in which the exterior panel is viewed head on.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2A illustrates an elevation view of a front panel of an example information handling system, in accordance with embodiments of the present disclosure;

FIGS. 2B-2D illustrate elevation views of a side of the example information handling system shown in FIG. 2A, in accordance with embodiments of the present disclosure.

DETAILED DESCRIPTION

Figure 1:
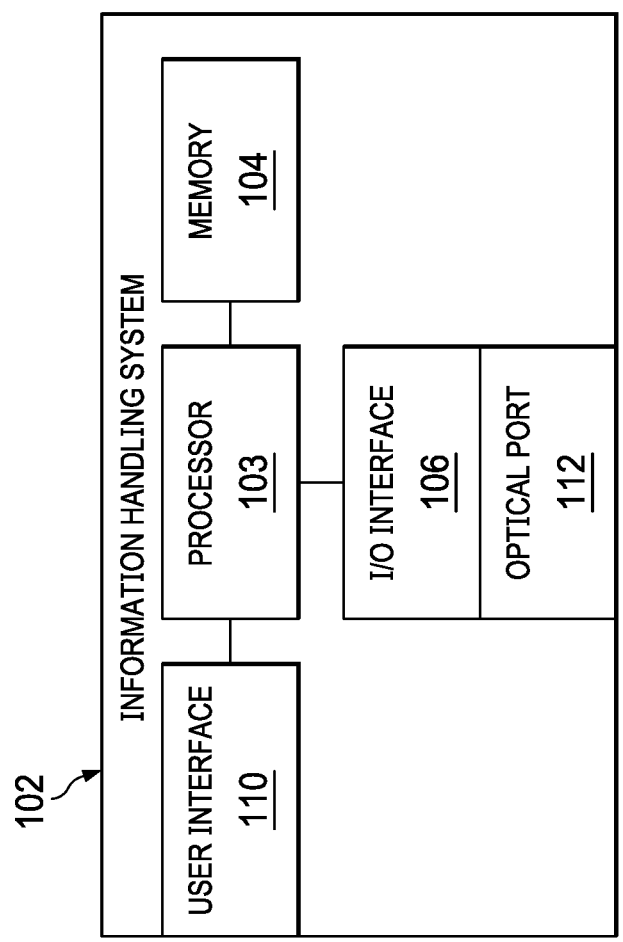
FIG. 1 illustrates a block diagram of selected components of an example information handling system, in accordance with embodiments of the present disclosure.

Preferred embodiments and their advantages are best understood by reference to FIGS. 1 through 3B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data. In yet other embodiments, information handling system 102 may comprise a server. In further embodiments, information handling system 102 may comprise a network switch.

As depicted in FIG. 1, information handling system 102 may include a processor 103, a memory 104 communicatively coupled to processor 103, an input/output interface 106 communicatively coupled to processor 103, a user interface 110 communicatively coupled to processor 103, and an optical port 112 communicatively coupled to I/O interface 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

I/O interface 106 may comprise any suitable system, apparatus, or device operable to serve as an interface between information handling system 102 and one or more other external devices. For example, in some embodiments, I/O interface 106 may comprise a network interface configured to serve as an interface between information handling system 102 and information handling systems via a network, in which case I/O interface 106 may comprise a network interface card, or "NIC."

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Optical port 112 may comprise an optical interface, having an optical connector (e.g., a multi-fiber push on or "MPO" connector). Accordingly, optical port 112 may be configured to receive an optical cable (e.g., a cable including a plurality of parallel optical fibers), and thus may communicate data through the cable via its optical connector, thus communicating to a device coupled to optical port 112 via the cable.

Although FIG. 1 depicts information handling system 102 having only a single optical port 112, in many embodiments, especially in those in which information handling system 102 is a network switch, information handling system 102 may have a plurality of optical ports 112.

In addition to processor 103, memory 104, I/O interface 106, user interface 110, and optical port 112, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

FIG. 2A illustrates an elevation view of a front panel of example information handling system 102, in accordance with embodiments of the present disclosure. In particular, FIG. 2A illustrates a front panel of an information handling system 102 implemented as a network switch. FIGS. 2B-2D illustrate elevation views of a side of example information handling system 102, in accordance with embodiments of the present disclosure.

As shown in FIGS. 2A-2D, information handling system 102 may have a plurality of optical ports 112. As described above with reference to FIG. 1, an optical port 112 may have a multi-fiber push on or "MPO" connector for receiving a corresponding MPO cable.

Further, as shown in FIGS. 2A-2D, the front panel of information handling system 102 may have a top row 202 of optical ports 112 and a bottom row 204 of optical ports 112. Top row 202 may comprise a plurality of front optical ports 112A which may be visible to a person (e.g., administrator, technician, or user) viewing the front panel head on and a plurality of rear optical ports 112B, each of which may be located directly behind front optical ports 112A (as viewed from the perspective of one viewing the front panel head on) and which may not be visible to a person viewing the front panel head on. Likewise, bottom row 204 may comprise a plurality of front optical ports 112C which may be visible to a person (e.g., administrator, technician, or user) viewing the front panel head on and a plurality of rear optical ports 112D, each of which may be located directly behind front optical ports 112C (as viewed from the perspective of one viewing the front panel head on) and which may not be visible to a person viewing the front panel head on.

As also shown in FIGS. 2C and 2D, optical ports 112 may receive cables 206 for communicatively coupling to other devices, each which may also include its own interface for coupling to a cable 206. Each cable 206 may include one or more parallel optical fibers. In some embodiments, each cable 206 may include an MPO form factor.

As further shown in FIGS. 2C and 2D, bottom row 204 may include a housing or other structure that may be mechanically translated from an open position as shown in FIG. 2C and a closed position as shown in FIG. 2D (and vice versa) to enable a person to physically access rear optical ports 112D of bottom row 204. For example, when a person desires to couple a cable 206 to a rear optical port 112D or decouple a cable 206 from a rear optical port 112D, the person may mechanically translate bottom row 204 from the closed position to the open position. Once the person has completed servicing rear optical ports 112D, the person may mechanically translate bottom row 204 from the open position to the closed position.

To facilitate translating bottom row 204 between the closed position and open position (and vice versa) the housing of bottom row 204 may be mechanically coupled to the enclosure/chassis of information handling system 102 in a drawer-like fashion that uses rails and rollers, or any other mechanical apparatus or combination of mechanical apparatuses that allows for sliding or other translation of bottom row 204 between the closed position and open position (and vice versa).

Figure 3B:
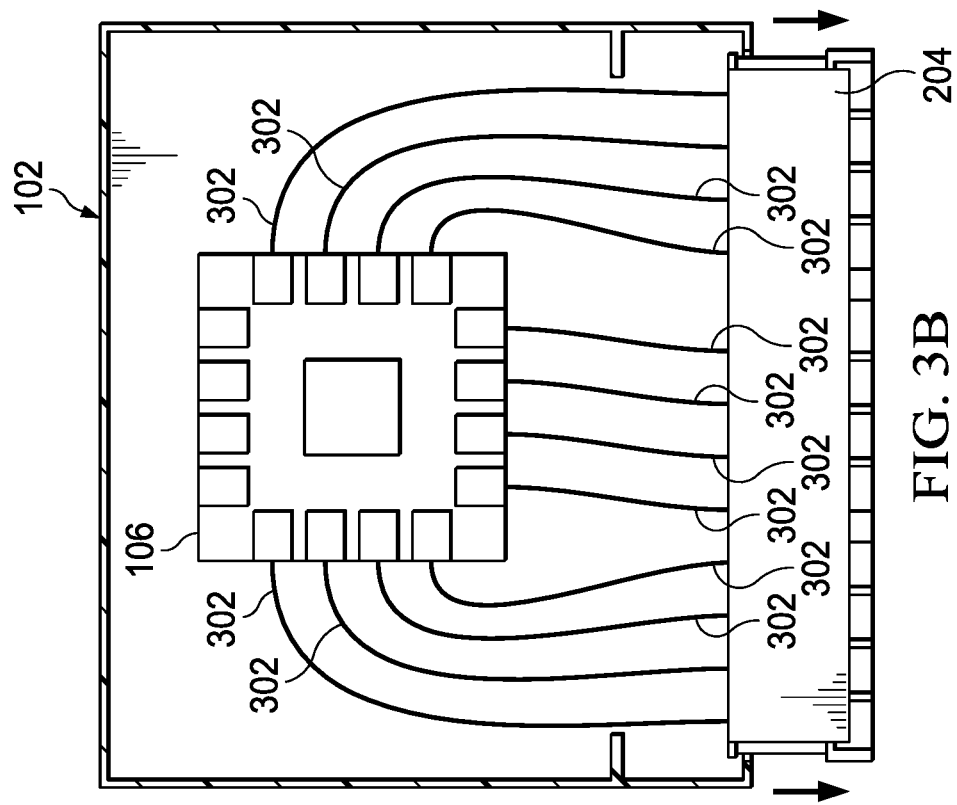
FIGS. 3A and 3B illustrate plan views of selected components of the example information system of FIG. 1, in accordance with embodiments of the present disclosure.
Figure 3A:
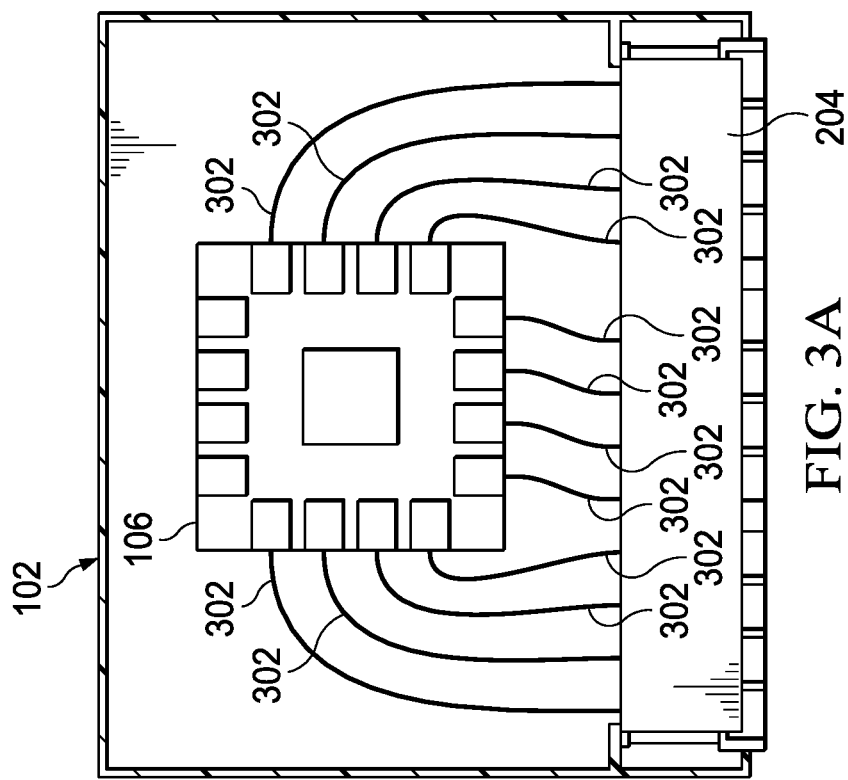

FIGS. 3A and 3B illustrate plan views of selected components of the example information system of FIG. 1, in accordance with embodiments of the present disclosure. For purposes of clarity of exposition, top row 202 is not depicted in FIGS. 3A and 3B. As shown in FIGS. 3A and 3B, the various optical ports 112 may be communicatively coupled to optical interface 106 (e.g., a co-packaged optics switch ASIC) via a plurality of internal fiber cables 302. Lengths of such internal fiber cables 302, in particular those internal fiber cables 302 communicatively coupling optical ports 112C and optical ports 112D of bottom row 204, may have lengths to allow translation of bottom row 204 from the closed position (e.g., shown in FIG. 3A) to the open position (e.g., shown in FIG. 3B) and vice versa.

Although the foregoing contemplates that bottom row 204 may be translatable between an open position and a closed position, in some embodiments, bottom row 204 may be fixed relative to the enclosure of information handling system 102 (e.g., may be fixed in either the position shown in FIG. 2B or in the positions shown in FIG. 2C).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system, comprising:
  a processor; and
  a plurality of ports communicatively coupled to the processor, and physically arranged in a first row and a second row at an exterior panel of an enclosure of the information handling system, such that the plurality of ports includes:
    front ports of the first row visible when the exterior panel is viewed head on;
    rear ports of the first row located directly behind the front ports of the first row from a perspective in which the exterior panel is viewed head on;
    front ports of the second row visible when the exterior panel is viewed head on; and
    rear ports of the second row located directly behind the front ports of the second row from the perspective in which the exterior panel is viewed head on;
  wherein the second row comprises a housing for housing the front ports of the second row and the rear ports of the second row, and the housing is mechanically coupled to the enclosure of the information handling system such that the housing is mechanically translatable from a closed position in which the rear ports of the second row are inaccessible to the exterior panel and an open position in which the rear ports of the second row are accessible to the exterior panel.

2. The information handling system of claim 1, wherein each of the plurality of ports comprises a port configured to receive a corresponding optical cable.

3. The information handling system of claim 2, wherein each of the plurality of ports comprises a multi-fiber push on port configured to receive a corresponding multi-fiber push on cable.

4. The information handling system of claim 1, wherein the information handling system comprises a switch.

5. The information handling system of claim 1, further comprising a plurality of internal cables configured to interface between the plurality of ports and the processor, wherein the plurality of internal cables interfaced between the processor of and the ports integral to the second row are sized with lengths enabling the housing to be mechanically translated between the closed position and the open position while maintaining communicative coupling of the ports integral to the second row to the processor via the internal cables.

6. The information handling system of claim 5, wherein each of the internal cables comprises an optical cable.

7. A method comprising:
  coupling a plurality of ports to a processor;
  physically arranging the plurality of ports in a first row and a second row at an exterior panel of an enclosure of an information handling system comprising the plurality of ports and the processor, such that the plurality of ports includes:
    front ports of the first row visible when the exterior panel is viewed head on;
    rear ports of the first row located directly behind the front ports of the first row from a perspective in which the exterior panel is viewed head on;
    front ports of the second row visible when the exterior panel is viewed head on; and
    rear ports of the second row located directly behind the front ports of the second row from the perspective in which the exterior panel is viewed head on; and
  mechanically coupling a housing comprising the second row of the plurality of ports to the enclosure of the information handling system such that the housing is mechanically translatable from a closed position in which the rear ports of the second row are inaccessible to the exterior panel and an open position in which the rear ports of the second row are accessible to the exterior panel.

8. The method of claim 7, wherein each of the plurality of ports comprises a port configured to receive a corresponding optical cable.

9. The method of claim 8, wherein each of the plurality of ports comprises a multi-fiber push on port configured to receive a corresponding multi-fiber push on cable.

10. The method of claim 7, wherein the information handling system comprises a switch.

11. The method of claim 7, further comprising a interfacing a plurality of internal cables between the plurality of ports and the processor; and
  sizing the plurality of internal cables interfaced between the processor of and the ports integral to the second row with lengths enabling the housing to be mechanically translated between the closed position and the open position while maintaining communicative coupling of the ports integral to the second row to the processor via the internal cables.

12. The method of claim 11, wherein each of the internal cables comprises an optical cable.

* * * * *